United States Patent [19]

Cerreta

[11] Patent Number: 4,827,702
[45] Date of Patent: May 9, 1989

[54] BLOWER ATTACHMENT FOR FILAMENT TRIMMERS

[76] Inventor: Jonathan D. Cerreta, 5646 W. Poinsettia Dr., Glendale, Ariz. 85304

[21] Appl. No.: 167,557

[22] Filed: Mar. 14, 1988

[51] Int. Cl.[4] .............................................. A01D 34/67
[52] U.S. Cl. ..................................... 56/12.7; 30/276; 56/13.4
[58] Field of Search ................... 56/12.7, 13.4; 30/276

[56] References Cited

U.S. PATENT DOCUMENTS

| | | | |
|---|---|---|---|
| 2,777,271 | 1/1957 | Sutton | 56/25.4 |
| 2,779,146 | 1/1957 | Mitchell et al. | 56/25.4 |
| 2,791,082 | 5/1957 | McDonough et al. | 56/13.4 |
| 3,091,906 | 6/1963 | Hall | 56/134 |
| 4,043,103 | 8/1977 | Lakin et al. | 56/295 |
| 4,183,138 | 1/1980 | Mitchell et al. | 56/12.7 |
| 4,187,577 | 2/1980 | Hansen et al. | 15/238 |
| 4,189,905 | 2/1980 | Frantello | 56/295 |
| 4,226,021 | 10/1980 | Hoff | 56/12.7 |
| 4,227,280 | 10/1980 | Comer | 15/330 |
| 4,242,794 | 1/1981 | Peterson | 56/2 |
| 4,335,567 | 6/1982 | Comer | 56/12.7 |
| 4,458,419 | 7/1984 | Proulx | 56/278 |
| 4,557,052 | 12/1985 | Baba et al. | 56/12.7 |
| 4,604,067 | 8/1986 | Roberts | 440/49 |

Primary Examiner—Paul J. Hirsch
Attorney, Agent, or Firm—Warren F. B. Lindsley

[57] ABSTRACT

A blower attachment comprising a band for slipping over and snugly engaging for rotation therewith a filament line spool of a conventional filament line trimmer. The band is provided with at least a pair of blades extending outwardly thereof.

1 Claim, 1 Drawing Sheet

BLOWER ATTACHMENT FOR FILAMENT TRIMMERS

BACKGROUND OF THE INVENTION

This invention relates to filament trimmers and, more particularly, to an attachment for conventional filament line trimmers which converts the trimmers into an apparatus for removal of the grass clippings generated during the trimming operation.

Filament line trimmers are well known in the art, and many such trimmers are presently commercially available from various manufacturers. Generally, a conventional filament line trimmer includes an electric motor or gas engine that rotatably drives a filament line at a relatively high rate of speed to cut grass and, in particular, to trim about the edges of swimming pools, patios, driveways and walkways, for example. The conventional line trimmer typically includes a spool of cutting filament which is attached to the shaft of the rotating electric motor or gas engine.

Prior to this invention, there existed no simple way of converting a filament trimmer to a dual functional apparatus which not only clips the grass, but also removes the grass clippings from the serviced area without extensive modification of the trimmer. Thus, the unsightly appearance left by clippings generated by the operation of a filament line trimmer is eliminated and the necessary operator time to collect and remove the clippings is greatly reduced.

DESCRIPTION OF THE PRIOR ART

U.S. Pat. No. 4,189,905 discloses an attachment for the drive shaft of rotary lawnmowers. The attachment replaces the normal metal blade, and comprises an outer cylindrical body having air vanes extending therefrom. A flexible cutting line extends through a tube and an aperture into the body of the device. The vanes assist in blowing grass from beneath the mower.

U.S. Pat. Nos. 4,242,794; 4,227,280 and 4,187,577 all show blower attachments for filament type trimmers. All of these patents require that the filament trimmer be removed and the fan or impeller be installed before converting from a filament trimmer to a blower.

Other U.S. Patents of general interest are listed below:
U.S. Pat. No. 4,604,067:
U.S. Pat. No. 4,335,567:
U.S. Pat. No. 2,777,271:
U.S. Pat. No. 2,779,146:

None of these are believed to be anticipatory individually or in combination of the claimed invention.

SUMMARY OF THE INVENTION

In accordance with the claimed invention, a new and improved fan blade attachment is provided for filament line trimmers which may be added to the rotating shaft of the trimmer, such as, for example, to the outer periphery of the filament line spool, for providing a blower function upon rotation thereof for removal of the clippings and debris generated by the filament line trimmer.

It is, therefore, one object of this invention to provide a blower attachment for detachably mounting around the filament line spool of a filament line trimmer.

Another object of this invention is to provide a resilient band for surrounding and adhering to the outer periphery of a filament line trimmer which has at least a pair of resilient blades extending laterally therefrom.

A further object of this invention is to selectively provide an endless resilient band for surrounding and adhering to the outer periphery of the filament line spool of a filament line trimmer without modification of the trimmer.

A still further object of this invention is to provide an inexpensively manufactured resilient band that may slip over the outer periphery of the filament line spool of a filament line trimmer which band has resilient blades extending laterally therefrom.

A still further object of this invention is to provide a lightweight, safe in operation blower attachment that may be easily detachably mounted to conventional flexible line grass or weed trimmers without modification of the trimmer.

Further objects and advantages of this invention will be pointed out with particularity in the claims annexed to and forming a part of this specification.

BRIEF DESCRIPTION OF THE DRAWING

The present invention may be more readily described with reference to the accompanying drawing, in which.

DESCRIPTION OF THE PREFERRED EMBODIMENT

Figures 1, 2, 3, 4, 5, 6:
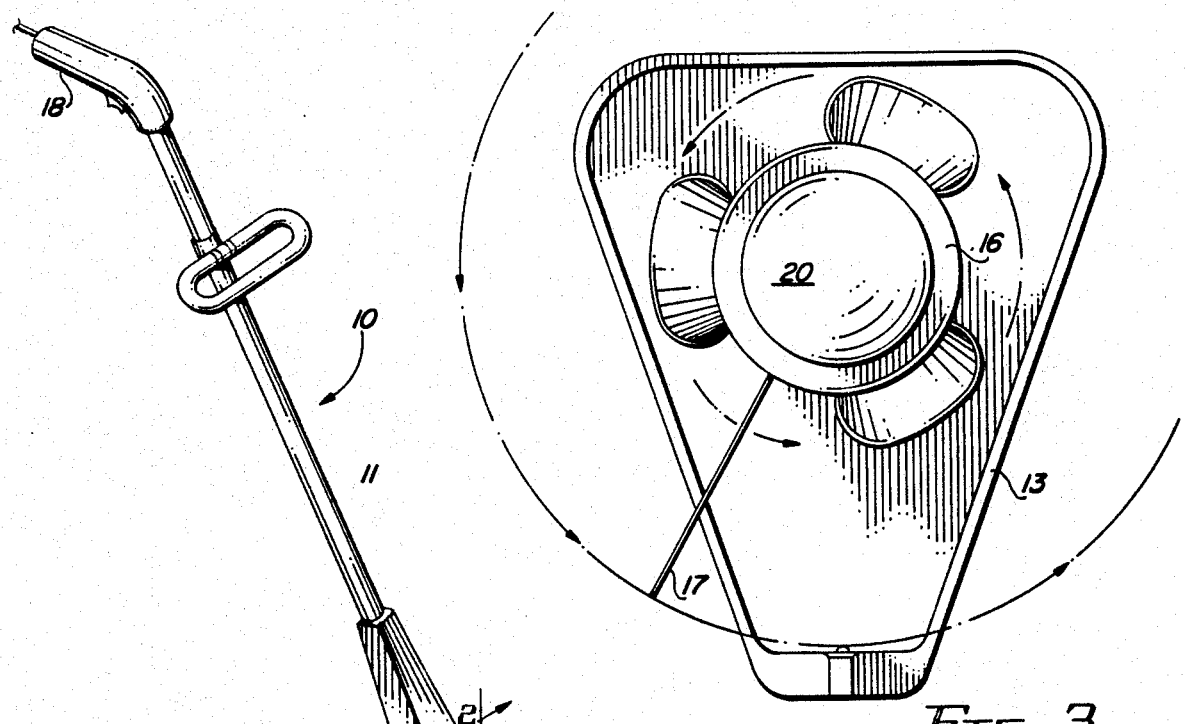
FIG. 1 is a perspective view of a filament line trimmer with a blower attachment and embodying the invention.
FIG. 2 is a cross-sectional view of FIG. 1 taken along the line 2—2.
FIG. 3 is a bottom view of the trimming head of the filament line trimmer shown in FIG. 1.
FIG. 4 is a perspective view of the blower attachment shown in FIGS. 1–3.
FIG. 5 is a perspective view of a modification of the blower attachment shown in FIG. 4.
FIG. 6 is a perspective view of a further modification of the blower attachments shown in FIGS. 4 and 5.

Referring more particularly to the drawing by characters of reference, FIGS. 1–3 disclose a conventional portable monofilament line trimmer 10 shown, for example, as being of an electric motor type comprising a handle 11 connected to a drive motor housing 12 having a lower flange 13. An electric motor 14 is mounted within housing 12 with its rotating shaft 15 extending into the area surrounded by flange 13 and attached to for rotating therewith a housing or spool 16 of a monofilament line 17. Electric motor 14 is connected to an electric cord 18 which extends through power.

The filament line spool 16 is mounted on shaft 15 to rotate therewith a spool of the monofilament line 17 housed therein in the well known manner. Housing 16 is provided with an aperture 19 therein through which the monofilament line 17 is fed outwardly therethrough a predetermined distance for providing the trimming function of the device as well known in the art. A bump button 20 is attached to the bottom of housing 12 for use in automatically dispensing line 17 from its spool in housing 12 when needed as well as providing a runner for moving the trimmer over the ground when in use.

In accordance with the claims of this invention, a blower attachment is provided which can be easily mounted to the conventional filament line trimmers to convert the trimmer into an apparatus for removal of the clippings and debris generated by its use. The clippings and debris are dispersed by blades added to the rotating spool 16 of filament line 17. These blades may be detachably mounted on housing 12 after a line trimming action, or they may be added to the housing and function during a filament line trimming function. Thus, the operator of the filament line trimmer is no longer faced with the unpleasant choice of either allowing the clippings and debris to leave an unsightly appearance or spend considerable time and labor in manually sweeping the clippings away.

As shown in FIGS. 1–4, the blower attachment 21 comprises an endless band 22, which may be, for example, formed of a resilient or non-yielding material, having two or more blades 23 suitably mounted on or formed as a part of the band and spaced apart about its outer periphery. The blades have working surfaces lying in planes extending laterally of the outer periphery of the band and disposed at an angle with the axis of shaft 15 of motor 14 such that the working surfaces are canted generally rearwardly with respect to the rotational direction of the movement of shaft 15.

As noted in FIG. 4, band 22 is provided with a slot 24 extending thereinto from its edge 25. This slot is intended to receive therethrough the filament line 17.

Thus, band 22, when added to a conventional filament line trimmer, is slid over the outer periphery of its spool 16, as shown in FIG. 2, with the filament line extending through slot 24. If band 22 is resilient, its diameter is so chosen that it snugly adheres to the outer periphery of spool 16 of trimmer 10. It rotates in unison with the rotating housing and its spool of filament line.

FIG. 5 illustrates a modification of the blower attachment 21, shown in FIG. 4, wherein blower attachment 26 comprises an endless resilient band 27 which is provided with a pair of blades 28 extending laterally outwardly thereof at diametrically opposed positions on the band. An aperture 29 is provided in the band for receiving the filament line 17 therethrough.

FIG. 6 discloses a further modification of the blower attachments 21 and 26 wherein blower attachment 30 comprises a band 31, the free ends of which are clamped together by a suitable buckle 32 engaging one of a number of clamps or apertures 33 positioned along the length of the band. Buckle 32 is an example of one of a number of known buckle fastening means that may be used for this purpose. Three blades 34 are spacedly positioned to extend outwardly of the periphery of the band in the manner heretofore explained.

From the above description, it is apparent that the present invention is a device that can be mounted on a conventional filament line trimmer to operate in conjunction with a grass or weed clipping operation to blow or sweep away the clippings and debris as they are being cut, or it can be utilized simply as a blower mounted on the housing of the filament line spool to sweep clippings or debris from unwanted areas of accumulation. Thus, after an operator has trimmed a location with the filament line trimmer, he may simply attach the blower attachment to the filament lie spool or housing and blow the grass clippings and debris from the trimmed area.

This blower attachment which may be molded from a suitable rubber or plastic material may be inexpensively manufactured and easily mounted on conventional filament line trimmers by operators of all ages. The blades or suitable protrusions may be molded as part of the band or suitably attached thereto and fall within the scope of this invention. The blade attachment may comprise slots in the outer periphery of the band into which an edge of the blade protrudes. Further, blades may be added directly to the housing of the spool and fall within the scope of this invention.

An improved blower attachment for filament line trimmers is thus provided and although but a few embodiments have been illustrated and described, it will be apparent to those skilled in the art that various additional changes and modifications may be made therein without departing from the spirit of the invention or from the scope of the appended claims.

What is claimed is:

1. A blower attachment for use with a filament line trimmer which has a shaft and means for rotatably driving the shaft, the shaft further having means thereon for normally securing a filament line spool thereto, comprising:

A band for detachably fitting around said spool for rotation therewith, said band having at least a pair of blades extending laterally therefrom, said blades upon rotation with said band blow-ing air and the grass clippings and debris cut by said trimmer away from the trimmed area, said band comprising a strip of resilient material, the ends of which are connected at one of a number of points along its length so as to snugly fit said spool.

* * * * *